United States Patent [19]

Saliba

[11] Patent Number: 5,055,959
[45] Date of Patent: Oct. 8, 1991

[54] TAPE HEAD WITH LOW SPACING LOSS PRODUCED BY NARROW AND WIDE WEAR REGIONS

[75] Inventor: George A. Saliba, Northboro, Mass.

[73] Assignee: Digital Equipment Corporation, Maynard, Mass.

[21] Appl. No.: 462,562

[22] Filed: Jan. 9, 1990

[51] Int. Cl.$^5$ ............................................. G11B 5/187
[52] U.S. Cl. ...................................... 360/122; 360/104
[58] Field of Search ................................. 360/122, 104

[56] References Cited

U.S. PATENT DOCUMENTS

| | | | |
|---|---|---|---|
| 4,322,764 | 3/1982 | Tanaka | 360/129 |
| 4,531,170 | 7/1985 | Takei et al. | 360/119 |
| 4,675,765 | 6/1987 | Segawa et al. | 360/122 |
| 4,797,767 | 1/1989 | Baus, Jr. | 360/121 |
| 4,809,110 | 2/1989 | Hertrich | 360/122 |
| 4,839,959 | 6/1989 | Mersing | 29/603 |
| 4,853,814 | 8/1989 | McClure | 360/122 |

Primary Examiner—A. J. Heinz
Attorney, Agent, or Firm—Fish & Richardson

[57] ABSTRACT

A tape head assembly for use in conjunction with a magnetic recording tape has a support structure, an island affixed to the support structure, and a transducer located on the island. The island has at least two sections of differing widths parallel to the direction of tape operation. The transducer is located in the wider section. The island is susceptible to wear as the magnetic recording tape streams across the island, such that the height profile of the island in a direction perpendicular to the direction of a tape operation varies over time. The island experiences substantially uniform wear at a substantially nonuniform height profile, and substantially nonuniform wear at a substantially uniform height profile.

15 Claims, 2 Drawing Sheets

TAPE HEAD WITH LOW SPACING LOSS PRODUCED BY NARROW AND WIDE WEAR REGIONS

BACKGROUND OF THE INVENTION

This invention relates to magnetic tape head assemblies for use in conjunction with magnetic recording tape.

Magnetic tape head assemblies typically contain one or more raised strips or "islands" over which the magnetic recording tape passes. Embedded in each island is a transducer, which may be an encoding element for writing information onto the tape, or a decoding element for reading information off of the tape. An encoding element produces a magnetic field in the vicinity of a small gap in the encoding element, which causes information to be stored on the magnetic recording tape as the tape streams over the island in contact with the island. Likewise, a decoding element detects a magnetic field near the surface of the tape as the tape streams over the island in contact with the island. Yet, there is typically some microscopic separation between the transducer and the recording tape that reduces the magnetic field strength detected by the tape or the decoding element. The reduction in the detected magnetic field strength is known as "spacing loss."

The magnetic field strength detected by the tape or the decoding element is proportional to $e^{-kd/\lambda}$, where d is the head-to-tape separation, $\lambda$ is the recording wavelength, and k is a constant. The detected magnetic field strength decreases exponentially both with respect to separation between the tape and the island and with respect to recording density (which is inversely related to the recording wavelength $\lambda$). Thus, while a limited amount of head-to-tape separation might be acceptable at low recording densities of 10-20 KFCI, at the higher densities (40-60 KFCI) of new, smaller transducers the head-to-tape separation must not exceed a few microinches.

When a uniform tension T is applied to a recording tape as the tape passes at a wrap angle $\theta$ around an island having a uniform height $I_H$ and a uniform width $I_w$, the tape exerts a pressure P against the island that is uniform along an axis down the center of the length of the island. The pressure P is essentially proportional to the tension T and the wrap angle $\theta$ and inversely proportional to the island width $I_w$. The pressure P of the tape against the island can be increased by increasing T or $\theta$, or by decreasing $I_w$, thereby reducing any microscopic separation between the tape and the encoding element, and hence reducing spacing loss. This increased pressure tends to cause the island to wear down more rapidly, however, resulting in a shortened head life. Moreover, the increased pressure may result in depressions in the island that also contribute to spacing loss, thus making spacing loss unavoidable.

SUMMARY OF THE INVENTION

The invention provides a tape head assembly for use in encoding or decoding a magnetic recording tape that passes over the assembly. The tape head assembly includes a transducer support that has a wear surface over which the tape passes and against which the tape exerts pressure. A transducer is located in the support to encode or decode the tape passing over the wear surface. The wear surface has a first, wider region in proximity to the transducer, and a second, narrower region aligned with the first region along an axis. The first region has a greater extent transverse to the axis than the second region.

Initially, the wear surface is at a uniform height along its length. The pressure (force per unit area) of the tape on the wider region is less than the pressure of the tape on the narrower region. Consequently, the friction force per unit area in the wider region is less than the friction force per unit area in the narrower region. Thus the narrower region tends to wear more rapidly than the wider section, until the wider region approaches a raised height relative to the narrower region. As the wider region becomes raised, the pressure of the tape on the wider region increases relative to the initial pressure on the wider region when the wear surface is at a uniform height. Eventually, the pressure across the entire wear surface becomes uniform, and consequently the wear across the wear surface becomes uniform. The wear surface continues to maintain a nonuniform height profile as it wears down uniformly in a self-adjusitng manner.

Because the wider region containing the transducer becomes raised relative to the narrower region, spacing between the transducer and the magnetic recording tape is reduced, and the spacing tends to vary less with respect to changes in tension of the magnetic recording tape. When the wider region containing the transducer is raised relative to the narrower region, the raised wider region ensures that any small surface irregularities in the narrower region do not lift the tape away from the transducer.

In preferred embodiments, the wear surface is provided by an island located on the transducer support. The island has three regions. A wide region containing the transducer is located between two narrower regions. The transducer is an encoding element for encoding information onto the magnetic recording tape, or a decoding element for reading information off of the magnetic recording tape. At the nonuniform height profile at which the island experiences substantially uniform wear, spacing between the transducer and the magnetic recording tape is low enough to permit recording by the transducer onto the magnetic recording tape at densities of at least 40 KFCI.

DESCRIPTION OF THE PREFERRED EMBODIMENTS

We first briefly describe the drawings.

STRUCTURE AND OPERATION

Figure 1:
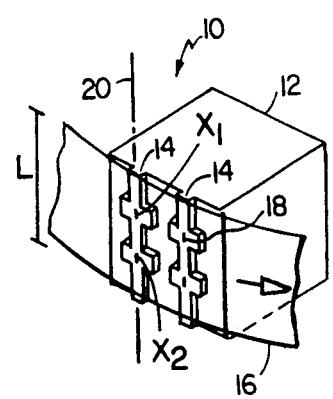
FIG. 1 is a drawing of a tape head assembly according to one embodiment of the invention.

Referring to FIG. 1, one embodiment of the invention includes a tape head assembly 10 with a transducer support structure 12 and a pair of islands 14 over which a magnetic recording tape 16 passes at tension $T_P$ in the direction indicated by the arrow in FIG. 1. Each island 14 provides a wear surface over which the tape 16 passes, and contains a pair of transducers 18, which may be magnetic encoding elements or decoding elements. Each encoding element forms a magnetic field in the vicinity of a narrow gap in the surface of the island 14. Each decoding element detects a magnetic field near the surface of the magnetic tape 16.

Figure 2:
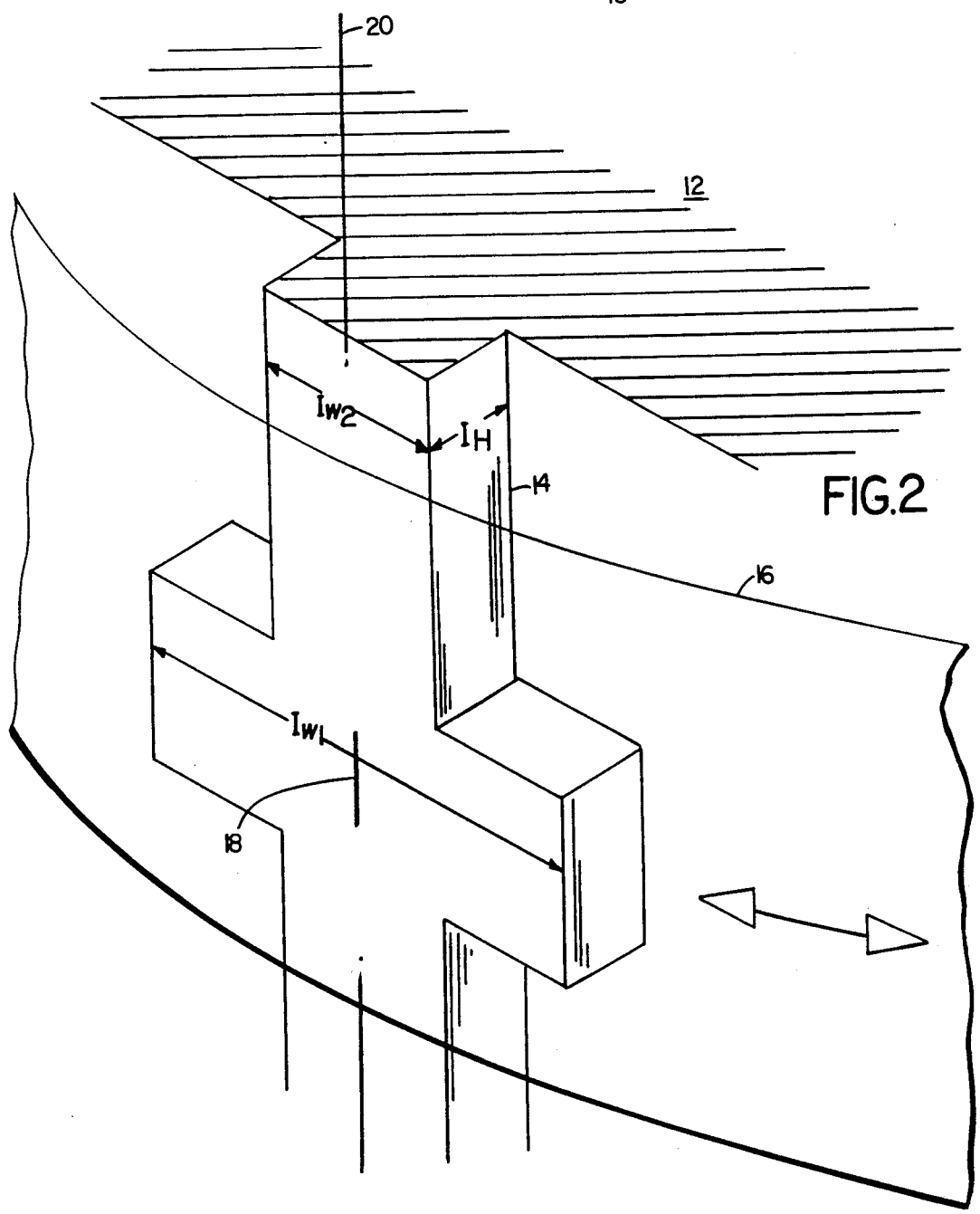
FIG. 2 is a drawing of a portion of an island on a tape head assembly according to one embodiment of the invention.

FIG. 2 shows an enlarged view of a portion of an island. The island has a height $I_H$, a width $I_{w1}$ in a first region surrounding a transducer, and a more narrow width $I_{w2}$ in a second region located away from the region surrounding the transducer. The wider region and the narrower region are aligned along axis 20. The wider region of the island need not have the rectangular protrusions as shown, but may instead have protrusions that are trapezoidal or rounded, or of various other shapes. As a practical matter, any sharp corners, which are undesirable, are quickly rounded off when tape 16 is run over the island. The wider region of the island 14 extends in the direction of axis 20 beyond the ends of transducer 18.

Figure 3:
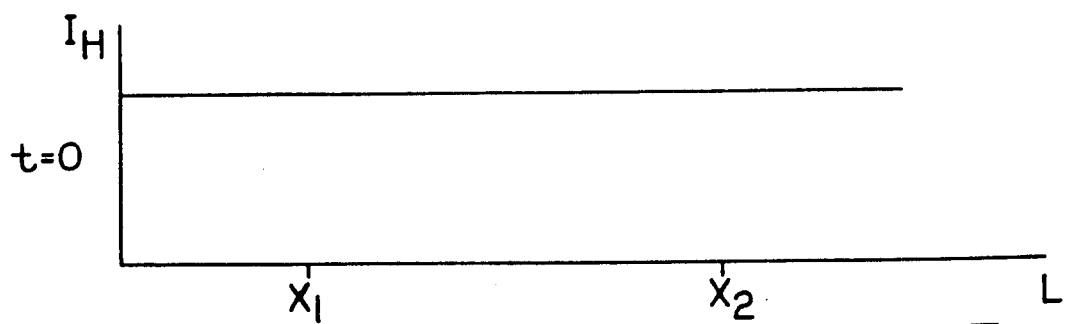
FIG. 3 is a graph showing island height as a function of position along the length of the island, when the island is in its initial condition.
Figure 4:
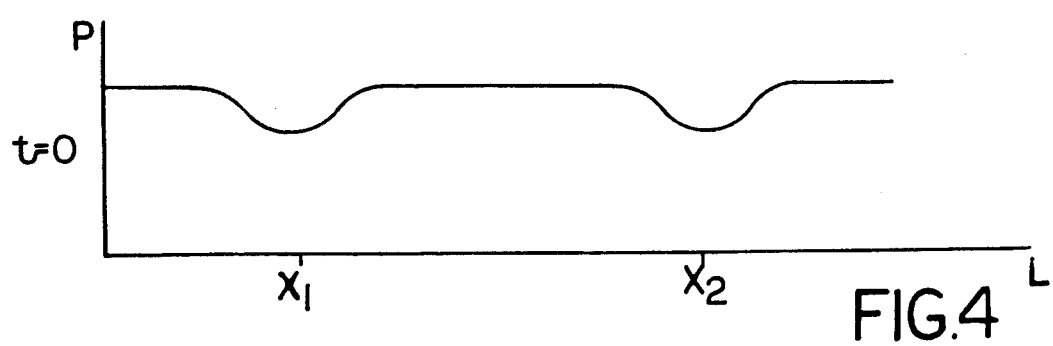
FIG. 4 is a graph showing pressure of a tape on the island as a function of position along the length of the island, when the island is in its initial condition.

As tape runs across an island of uniform height but nonuniform width, the island will experience a pressure p that is nonuniform along the length of the island. So long as the height of the island remains uniform, the nonuniform pressure p will tend to be higher in the narrower regions of the island than in the wider regions of the island. FIGS. 3 and 4 illustrate, respectively, the height $I_H$ and the pressure p on the island of FIG. 1, along an axis down the center of its length L. The island is in its initial condition, at time $t=0$, before any wear has occurred. The island has two transducers, located at points $X_1$ and $X_2$ along the island's length. The width of the island is greater in the vicinity of points $X_1$ and $X_2$ than at other locations along the island's length. As shown in FIG. 3, the island height $I_H$ is uniform across the length of the island at time $t=0$. As shown in FIG. 4, at time $t=0$ the pressure p is reduced over the wider regions of the island containing the transducers, relative to the more narrow regions of the island.

Since the pressure (force per unit area) of the tape on the island is proportional to the frictional force per unit area on the island, the wider regions of the island initially experience less friction than the narrower regions. Thus, at time $t=0$ the island begins to wear nonuniformly, with the regions under the most pressure experiencing the most friction, and hence experiencing the most wear. The wider regions tend to wear less because they initially experience less pressure, and hence experience less friction.

The reduced pressure over the transducer would appear to be undesirable, because as the pressure p decreases, separation between the tape and the island tends to increase, leading to spacing loss between the transducer and the tape. The pressure does not remain nonuniform for long, however. After a short initial break-in period, the system quickly stabilizes from the configurations shown in FIGS. 3 and 4 to the configurations shown in FIGS. 5 and 6.

Figure 5:
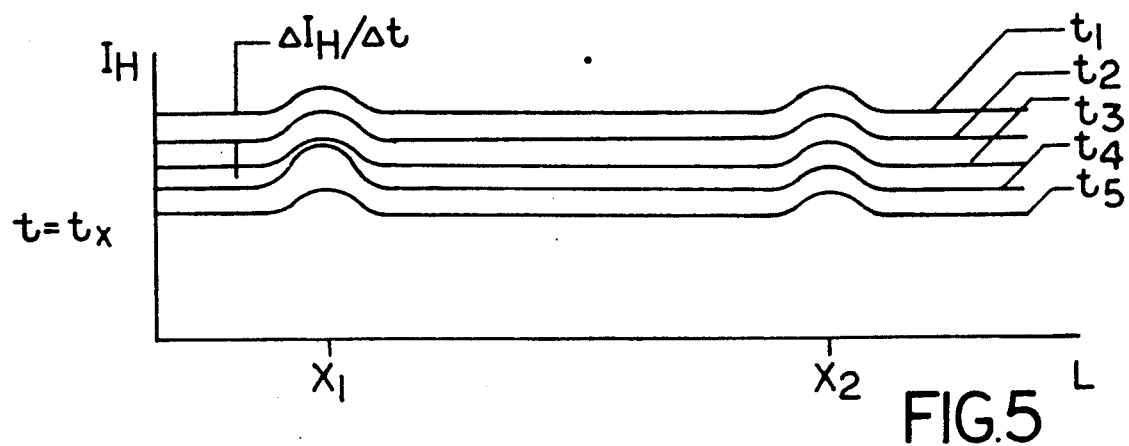
FIG. 5 is a graph showing island height as a function of position along the length of the island, at several points in time after a tape has begun to wear on the island.
Figure 6:
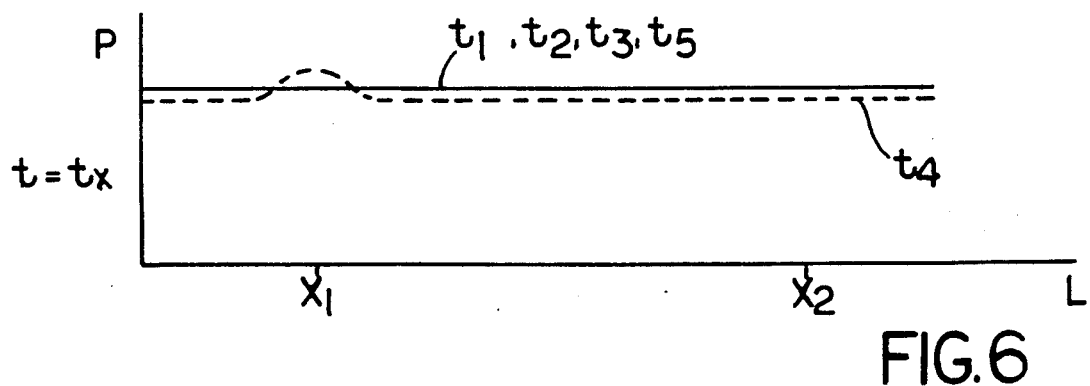
FIG. 6 is a graph showing pressure of a tape on the island as a function of position along the length of the island, at several points in time after the tape has begun to wear on the island.

FIG. 5 shows the island height $I_H$ at times $t_1$, $t_2$, and $t_3$ as tape is passed over the island. Due to the initial nonuniform wear on the island during the break in period as described above, at time $t_1$ the regions surrounding the transducers have become raised with respect to the rest of the island. The raising, after break-in, of the wider regions of the island tends to lead to increased pressure of the tape on the raised regions. Thus, the pressure p of the tape on the island, which was initially reduced over the wider regions of the island as compared to the narrower regions of the island, as shown in FIG. 4, quickly stabilizes to become approximately uniform along the length of the island. The uniform pressure at times $t_1$, $t_2$, and $t_3$ is shown in FIG. 6. Once the pressure has become uniform, the island begins to wear down uniformly, as indicated by $\Delta I_H / \Delta t$. As shown in FIG. 5, the raised regions remain raised with respect to the rest of the island. Thus, the island experiences nonuniform wear at a substantially uniform height profile and substantially uniform wear at a nonuniform height profile.

The process of wear is self-adjusting for the life of the head. If the raised regions become too high or too low the rate of wear on the raised regions will accordingly increase or decrease. Thus, if at time $t_4$ the raised region in the vicinity of $X_1$ has become too high, as shown in FIG. 5, the pressure p at time $t_4$ increases in the vicinity of $X_1$, relative to the pressure over the rest of the island, as shown in FIG. 6. The increased pressure in the vicinity of $X_1$ causes the rate of wear of the raised region surrounding $X_1$ to increase, so that at time $t_5$ the height profile of the island has returned to its desired configuration as shown in FIG. 5. When the height profile has returned to its desired configuration, the pressure p once again becomes substantially uniform along the length of the island as shown in FIG. 6.

Because the regions surrounding the transducers are raised, separation between the transducers and the tape is reduced compared to the separation between the narrow regions of the island and the tape, thereby minimizing spacing loss. The raising of the regions of the island surrounding the transducers ensures that any small surface irregularities in the narrow regions of the island do not lift the tape away from the transducers. The reduction in transducer-to-tape separation ensures that the tape will adequately detect the small magnetic fields created by high-density (40-60 KFCI) encoding elements, and that high-density decoding elements will adequately detect the small magnetic fields near the surface of the tape. Yet, since the reduction in transducer-to-tape separation is achieved by virtue of the geometry of the island, rather than by increasing overall pressure on the island, the overall rate of wear of the island is no greater than the overall rate of wear of a similar island of uniform width. Moreover, in the event of any sudden reduction in the tension of the recording tape, the raised portions of the island will tend to remain in substantial contact with the tape after the tape has begun to separate from the other parts of the island. The reduced transducer-to-tape spacing of the invention also allows the tape head assembly to be utilized with lower density transducers at reduced tension on the recording tape, and hence reduced pressure of the tape on the island, thereby minimizing wear on the island and lengthening the life of the head.

Other embodiments are within the following claims.

I claim:

1. A tape head assembly, having a tape facing surface, for use in encoding or decoding a magnetic recording tape passing thereover comprising, a transducer support have a raised surface, and against which said tape exerts pressure, said raised surface being constructed to be sufficiently close to said tape to constitute a wear surface, a transducer mounted in said support to encode or decode said tape passing over said surface, said wear surface being divided along an axis into a first region and a second region, said first region being in proximity to said transducer, said first region having a greater extent transverse to said axis than said second region, so as to present to said tape a wear surface portion that is wider than that presented by said second region, thereby permitting the maintenance of said wear surface closer to said tape in said first region than in said second region.

2. The tape head assembly of claim 1, wherein a portion of said first region lies between said transducer and said second region along the direction of said axis.

3. The tape head assembly of claim 2, wherein said second region has first and second portions spaced along said axis and said first region extends between said portions of said second region.

4. The tape head assembly of claim 3, wherein said raised surface is an island providing said wear surface, said island extending along said axis and having a wide region separating two narrow regions, said transducer being in said wide region.

5. A tape head assembly of claim 1, wherein said regions are of material of the same wearability, so that any differential wear rate is due essentially to differential tape pressure.

6. The tape head assembly of claim 1 in a condition wherein said regions are of uniform height, so that in initial use said second region will wear faster than said first region, to bring said first region closer to said tape.

7. The tape head assembly of claim 1 in a condition wherein said first region is closer to said tape than said second region.

8. The tape head assembly of claim 1 wherein said first region extends transverse to said axis sufficiently beyond the extent of said second region to permit transfer of information between said transducer and said tape at a density of at least 40 KFCI.

9. A tape head assembly, having a tape facing surface, for use in encoding or decoding a magnetic recording tape passing thereover comprising, a transducer support having an island that provides a raised surface, and against which said tape exerts pressure, said raised surface being constructed to be sufficiently close to said tape to constitute a wear surface, and a transducer mounted in said island to encode or decode said tape passing over said wear surface, said island extending along an axis, and having a wide region separating two narrow regions, thereby permitting maintenance of said wear surface closer to said tape in said wide region than in said narrow regions, said transducer being located in said wide region, said regions being of material of the same wearability, so that any differential wear rate is due essentially to differential tape pressure.

10. A tape head assembly, having a tape facing surface, for use in encoding or decoding a magnetic recording tape passing thereover comprising a transducer support having an island that provides a raised surface, and against which said tape exerts pressure, said raised surface being constructed to be sufficiently close to said tape to constitute a wear surface, and a transducer mounted in said island to encode or decode said tape passing over said wear surface, said island extending along an axis, and having a wide region separating two narrow regions, thereby permitting maintenance of said wear surface closer to said tape in said wide region than in said narrow regions, said transducer being located in said wide region, a portion of said wide region lying between said transducer and each of said narrow regions along the direction of said axis, said wide region extending transverse to said axis sufficiently beyond the extent of said narrow regions to permit transfer of information between said transducer and said tape at a density of at least 40 KFCI, said regions being of material of the same wearability, so that any differential wear rate is due essentially to differential tape pressure.

11. A method of using a tape head assembly, having a tape facing surface, in conjunction with a magnetic recording tape, comprising the steps of providing a transducer support having a raised surface, relative to said tape facing surface, constructed to be sufficiently close to said tape to constitute a wear surface, said wear surface being divided along an axis into a first region and a second region, said first region being in proximity to a transducer, said first region having a greater extent transverse to said axis than said second region, said first region having a raised height relative to said second region, and running a tape over said wear surface in a manner such that said tape exerts pressure on said wear surface, while transferring information between said transducer and said tape, said pressure of said tape on said wear surface causing said first and second regions to tend to wear down at substantially the same rate, to thereby maintain said raised height of said first region relative to said second region, and hence to reduce separation between said tape and said transducer and thereby reduce spacing loss.

12. A method of using a tape head assembly, having a tape facing surface, in conjunction with a magnetic recording tape, comprising the steps of running tape over a raised surface, relative to said tape facing surface, surface of a transducer support in a manner such that said tape exerts pressure on said raised surface, said raised surface being constructed to be sufficiently close to said tape to constitute a wear surface, said wear surface being divided along an axis into a first region and a second region, said first region being in proximity to a transducer, said first region having a greater extent transverse to said axis than said second region, said pressure of said tape on said wear surface causing said second region to tend to wear down faster than said first region, until said first region approaches a raised height relative to said second region, at which raised height said first and second regions tend to wear down at substantially the same rate, thereby maintaining said raised height of said first region relative to said second region, and continuing to run a tape over said wear surface while transferring information between said transducer and said tape, said raised height of said first region serving to reduce separation between said tape and said transducer and thereby serving to reduce spacing loss.

13. The method of claim 11 or 12, wherein the step of transferring information between said transducer and said tape comprises encoding information onto the recording tape by means of the transducer.

14. The method of claim 11 or 12, wherein the step of transferring information between said transducer and said tape comprises decoding information from said recording tape by means of said transducer.

15. The method of claim 11 or 12, wherein said information on said recording tape has a density of at least 40 KFCI.

* * * * *

UNITED STATES PATENT AND TRADEMARK OFFICE
CERTIFICATE OF CORRECTION

PATENT NO.  : 5,055,959

DATED       : October 8, 1991

INVENTOR(S) : George A. Saliba

It is certified that error appears in the above-identified patent and that said Letters Patent is hereby corrected as shown below:

On the Title page,
In the References Cited:

Please add the following U.S. patents, including related pertinent information for each:

4,300,179, 11/81, Barnes, 360/122x
4,686,596, 8/87, Kraemer, 360/122x
4,949,208, 8/90, Milo, 360/122

Col. 5, line 1, "have" should be --having--;
       line 1, insert --relative to said tape facing surface,-- after "surface,";
       line 1, delete "and";
       line 49, insert --relative to said tape facing surface,-- after "surface,";
       line 49, delete "and";
       line 66, insert --,-- after "thereover";
       line 68, insert --relative to said tape facing surface,-- after "surface";
       line 68, delete "and";

UNITED STATES PATENT AND TRADEMARK OFFICE
CERTIFICATE OF CORRECTION

PATENT NO. : 5,055,959

DATED : October 8, 1991

INVENTOR(S) : George A. Saliba

It is certified that error appears in the above-identified patent and that said Letters Patent is hereby corrected as shown below:

Col. 6, line 52, delete "surface" (second occurrence).

Signed and Sealed this

Twenty-fifth Day of May, 1993

Attest:

MICHAEL K. KIRK

*Attesting Officer*   Acting Commissioner of Patents and Trademarks